(12) United States Patent
Towndrow et al.

(10) Patent No.: US 8,184,375 B2
(45) Date of Patent: May 22, 2012

(54) WAVELENGTH SEPARATING BEAMSPLITTER

(75) Inventors: Clive Towndrow, Huntington Beach, CA (US); James Brian Caldwell, Petersburg, VA (US)

(73) Assignee: Panavision Federal Systems, LLC, Woodland Hills, CA (US)

( * ) Notice: Subject to any disclaimer, the term of this patent is extended or adjusted under 35 U.S.C. 154(b) by 193 days.

(21) Appl. No.: 12/491,140

(22) Filed: Jun. 24, 2009

(65) Prior Publication Data
US 2009/0323192 A1 Dec. 31, 2009

Related U.S. Application Data

(60) Provisional application No. 61/076,484, filed on Jun. 27, 2008.

(51) Int. Cl.
G02B 27/14 (2006.01)

(52) U.S. Cl. ........................................................ 359/634

(58) Field of Classification Search .................. 359/629, 359/634, 636, 638; 385/36
See application file for complete search history.

(56) References Cited

U.S. PATENT DOCUMENTS

| | | | |
|---|---|---|---|
| 2,737,076 A | 3/1956 | Rock, Jr. |
| 3,202,039 A | 8/1965 | De Lang et al. |
| 3,798,354 A | 3/1974 | Asou |
| 3,905,684 A | 9/1975 | Cook et al. |
| 3,922,069 A | 11/1975 | Kishikawa et al. |
| 3,932,027 A | 1/1976 | Cook et al. |
| 3,976,363 A | 8/1976 | Toyama et al. |
| 4,009,941 A | 3/1977 | Verdijk et al. |
| 4,035,836 A | 7/1977 | Miyaji et al. |
| 4,084,180 A | 4/1978 | Stoffels et al. |
| 4,268,119 A | 5/1981 | Hartmann |
| 4,425,028 A | 1/1984 | Gagnon et al. |
| 4,687,301 A | 8/1987 | Ledebuhr |
| 4,690,526 A | 9/1987 | Ledebuhr |
| 4,784,469 A | 11/1988 | Tsukada et al. |
| 4,969,730 A | 11/1990 | van den Brandt |

(Continued)

FOREIGN PATENT DOCUMENTS
DE 2012480 A1 10/1971
(Continued)

OTHER PUBLICATIONS

International Search Report mailed Aug. 20, 2009, for PCT Application No. PCT/US09/48519, filed Jun. 24, 2009, two pages.

(Continued)

Primary Examiner — Joseph P Martinez
(74) Attorney, Agent, or Firm — Connolly Bove Lodge & Hutz LLP

(57) ABSTRACT

A prism system is disclosed for splitting a broadband incoming light beam. In one embodiment, the broadband beam enters the prism system and is shifted laterally through a parallelogram shaped prism. The beam then encounters a first dichroic coating treated surface. The light that is reflected off of the surface strikes the internal wall of the prism to undergo total internal reflection within the prism. The beam exits the prism parallel to the original incoming broadband beam. The beam that passes through the dichroic surface reaches a second dichroic coating treated surface where a specified waveband of light is reflected while the remaining wavelengths pass through. The beam reflected by the second dichroic surface undergoes a total internal reflection and exits parallel to the incoming broadband beam. The light beam which passes through the second dichroic surface exits the prism parallel to the original incoming broadband beam.

52 Claims, 11 Drawing Sheets

U.S. PATENT DOCUMENTS

| | | | |
|---|---|---|---|
| 4,983,032 A | | 1/1991 | Van Den Brandt |
| 5,644,432 A | | 7/1997 | Doany |
| 5,671,047 A | * | 9/1997 | Curbelo .................. 356/452 |
| 5,777,674 A | | 7/1998 | Ohmuro |
| 5,999,669 A | * | 12/1999 | Pan et al. ................. 385/18 |
| 6,144,498 A | | 11/2000 | Bryars et al. |
| 6,280,037 B1 | * | 8/2001 | Smith ........................ 353/31 |
| 6,644,813 B1 | * | 11/2003 | Bowron ..................... 353/31 |
| 2005/0180687 A1 | * | 8/2005 | Amitai ...................... 385/31 |
| 2007/0206477 A1 | * | 9/2007 | Raniuk et al. ............. 369/97 |

FOREIGN PATENT DOCUMENTS

| | | |
|---|---|---|
| DE | 2235873 A1 | 2/1973 |
| GB | 1251482 | 10/1971 |
| WO | WO-2009/158434 A1 | 12/2009 |

OTHER PUBLICATIONS

Stephany, U.S. Defensive Publication No. T938,006, Imaging System, filed Oct. 11, 1974, published Sep. 2, 1975.

* cited by examiner

WAVELENGTH SEPARATING BEAMSPLITTER

CROSS-REFERENCE TO RELATED APPLICATIONS

This application also claims the benefit of U.S. Provisional Patent Application No. 61/076,484, filed on Jun. 27, 2008, the contents of which are also incorporated herein by reference in their entirety for all purposes.

BACKGROUND OF THE INVENTION

1. Field of the Invention

The present invention relates to the field of waveband separating prisms. More specifically, the invention relates to prism systems that separate an incoming beam of broad spectrum light into two or more outgoing beams, where each of the outgoing beams is either parallel or perpendicular to the direction of the incoming beam. Each of the outgoing beams encompasses a waveband that is a subset of the original incoming beam.

2. Description of Related Art

Waveband separating beamsplitters have long been used in television and video cameras in order to efficiently split visible white light into red, green, and blue components that are directed to three separate sensors. This approach maximizes both throughput and resolution. Waveband separating beamsplitters are also widely used in multi-panel projection systems, although in such applications the beamsplitter is actually used as a beam combiner to combine the narrow band light from two or more object panels into a single beam of broadband light.

A conceptually simple method of splitting a broadband beam of light into multiple beams of narrower bands of light is achieved through the use of what is referred to as a "cross dichroic waveband splitting prism cube," or "X Splitter," or sometimes as a "Cube Color Splitter." FIG. 1 depicts this type of beam splitter. (Although it is most often used for color combining, it may also serve equally well as a color separating prism by simply reversing the roles of the incoming and outgoing beams.) The cross dichroic beam splitting prism is frequently used in LCD projectors for combining light from three differently colored image panels. This prism system has dichroic surfaces (or mirrors) inclined at a 45 degree angle to the incoming beam. When used in applications such as an LCD projector, where the light is predominantly polarized, a relatively steep angle of 45 degrees is suitable. However, in applications where the incoming light beam consists of non-polarized light, the prism will suffer from negative polarization effects. In particular, the beamsplitting efficiency will vary with respect to s-polarized and p-polarized light. Interference will be created at this surface and can destroy the color purity of the device.

It has been reported that dichroic coatings exist which overcome this interference at angles of 45 degrees. However, these coatings require the application of up to 77 layers of film. A preferred means of splitting beams composed of non-polarized light would be to use a dichroic surface at a much shallower angle of around 15 degrees. As such angles, the cross dichroic prism would not function.

The beamsplitter of choice for most three-sensor camera systems is illustrated in FIG. 2, and was first disclosed by d Lang et al. in U.S. Pat. No. 3,202,039. An alternative to the cross dichroic beam splitting prism cube is the well-known Total Internal Reflection (TIR) beamsplitting prism. The advantage of the TIR beamsplitter is that the dichroic surfaces are inclined at a very shallow angle with respect to the incoming beam. Numerous modifications have appeared in the patent literature over the years, including those disclosed in U.S. Pat. Nos. 4,009,941, 4,035,836, 4,084,180, 4,784,496, 5,644,432, and 6,144,498. Two, four, and five channel variations are known of this basic prism type.

A drawback to this method is that the three output beams of the three-channel TIR beamsplitters are not oriented parallel to the direction of the incoming beam, thereby making them unfeasible for use in applications such as a periscope, which requires the system to be inserted into a cylindrical housing sleeve.

Therefore, there is a need for a compact waveband separating prism system where each of the outgoing beams is either parallel or perpendicular to the direction of the incoming beam. Such a beamsplitting prism would have wide-ranging applications in cameras, projectors, and optical systems requiring multiple wavebands.

SUMMARY OF THE INVENTION

The prism system according to embodiments of the present invention provides for the splitting of a broadband incoming light beam into two or more component beams oriented either parallel or perpendicular to the original incoming beam. Superior geometric flexibility is achieved through the use of dichroic coatings applied to particular surfaces of certain prism elements and the minimization of the angle of incidence at the dichroic surfaces by means of unique geometrical shapes of the prism elements.

In one embodiment, a broadband beam of light is split into three beams of light oriented parallel to the incoming beam. An example in which a broadband beam of light can be split into three separate beams is a three-channel periscope system in which a 2-octave (450-1800 nm) input beam is efficiently split into three imaging channels. These three channels may have individual wavebands of 450-650 nm, 650-900 nm, and 900-1800 nm, respectively.

The broadband beam enters the prism system and is shifted laterally through reflection inside a parallelogram shaped prism. The beam then encounters a first dichroic coating treated surface, allowing certain wavelength of light to reflect off of the surface while allowing other wavelengths to pass through. The light that is reflected off of the surface strikes the internal wall of the prism at such an angle as to undergo total internal reflection within the prism. Due to the geometry of the prism, the beam exits the prism in an orientation that is parallel to the original incoming broadband beam.

The beam which passes through the dichroic surface reaches a second dichroic coating treated surface where, again, a specified waveband of light is reflected while the remaining wavelengths pass through. As with the first separated beam of light, the beam reflected by the second dichroic surface undergoes a total internal reflection within the respective prism and exits in an orientation that is parallel to the incoming broadband beam. The light beam which passes through the second dichroic surface exits the prism in a parallel orientation with respect to the original incoming broadband beam.

What makes this embodiment particularly interesting is its compact geometry. The parallel orientation of the output beams with respect to the incoming broadband beam allows the entire prism system to make use of two pivot surfaces which are normal to the incoming beam. By rotating the prism elements with respect to the pivot surfaces, the invention may be folded into a compact three dimensional configuration that may be inserted into a compact cylindrical sleeve, such as a periscope tube.

Other embodiments include a three channel beam splitting prism system which allows for a perpendicular orientation of the output beams with respect to the incoming broadband beam. Similar pivot surfaces can exist for this embodiment.

In another exemplary embodiment of the present invention, the incoming broadband beam is split into two narrower beams. This two-channel invention requires only a single dichroic surface to separate the wavebands. Embodiments of the present invention can include output beams oriented either parallel or perpendicular with respect to the incoming beam.

Embodiments of the present invention are suitable for use in cameras, projectors, and any other optical instruments that require multiple wavebands, such as multispectral camera systems incorporating two or more sensors. Embodiments of the present invention are particularly suitable for use in optical systems in which the demands imposed on mechanical packaging and dichroic mirror performance are particularly severe.

DETAILED DESCRIPTION OF DRAWINGS

Reference is made to the accompanying drawings that form a part hereof, and in which is shown by way of illustration specific embodiments in which the invention may be practiced. It is to be understood that other embodiments may be utilized and structural changes may be made without departing from the scope of the preferred embodiments of the present invention.

Figure 1:
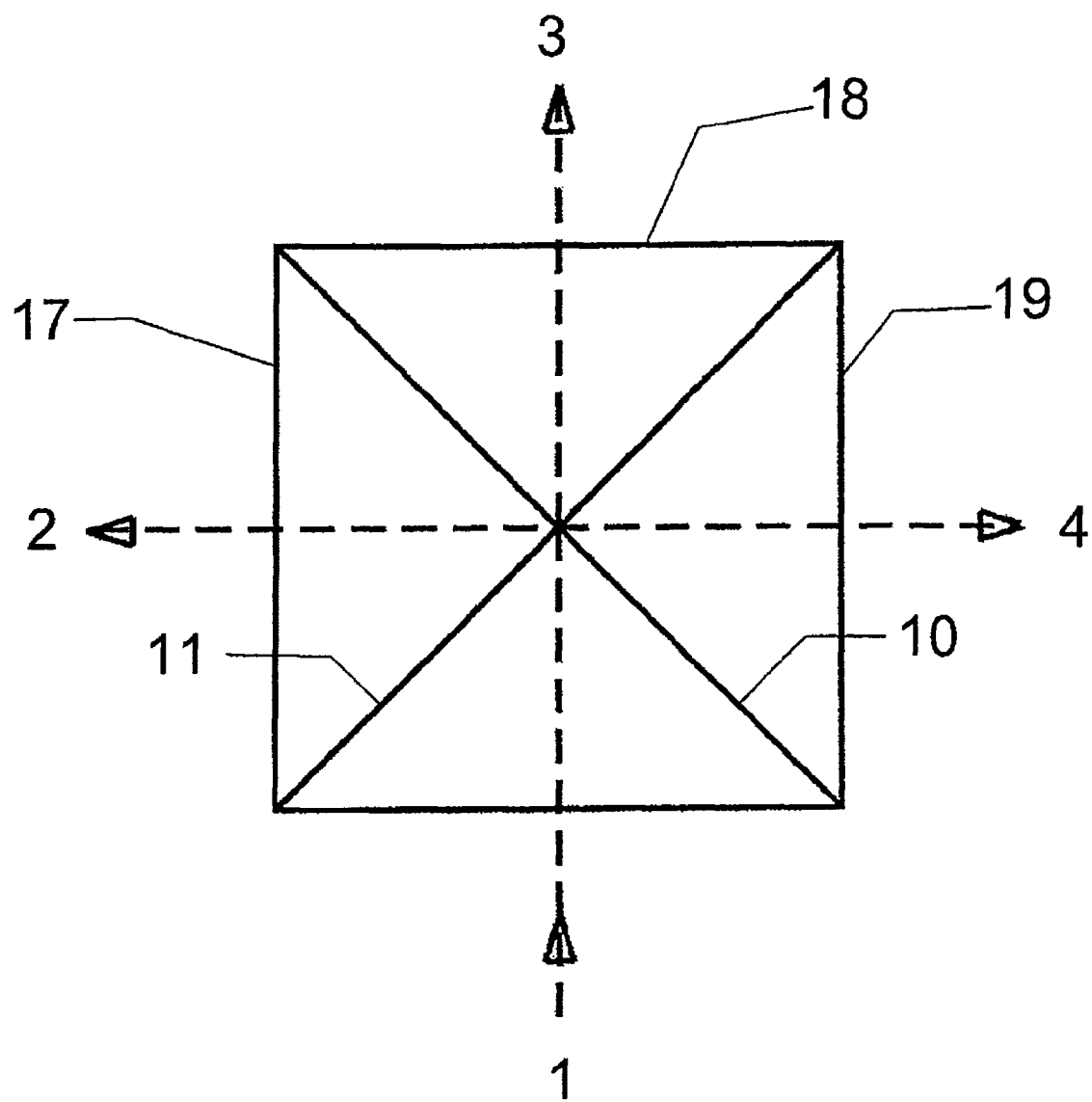
FIG. 1 illustrates an embodiment of a cross dichroic waveband splitting prism system.

Referring to the drawings in detail, FIG. 1 illustrates a cross dichroic waveband splitting prism system. This system includes four component prisms which are joined together to create the form of a cube. The cross dichroic prism system splits a beam of incoming broadband light into three outgoing component beams. Typically, a beam of white light 1 enters the cross dichroic prism system through the front face, and colored beams of red, green, and blue light exit from respective side faces. The interfaces 10 and 11 between the four prism components act to provide the beam splitting properties of this embodiment. A dichroic film is applied to the prism interfaces, which allows light of certain bands to substantially pass through, whereas other bands of light are substantially reflected. Light 2 exiting face 17 is substantially composed of s-polarized light being selectively reflected off of interface 10. Likewise, light 4 exiting the opposite face 19 is substantially composed of s-polarized light be selectively reflected off of interface 11. In the cross dichroic prism system, the light 3 exiting the opposing face 18 to the incoming beam 1 consists substantially of p-polarized light having passed though both 10 and 11 interfaces.

Figure 2:
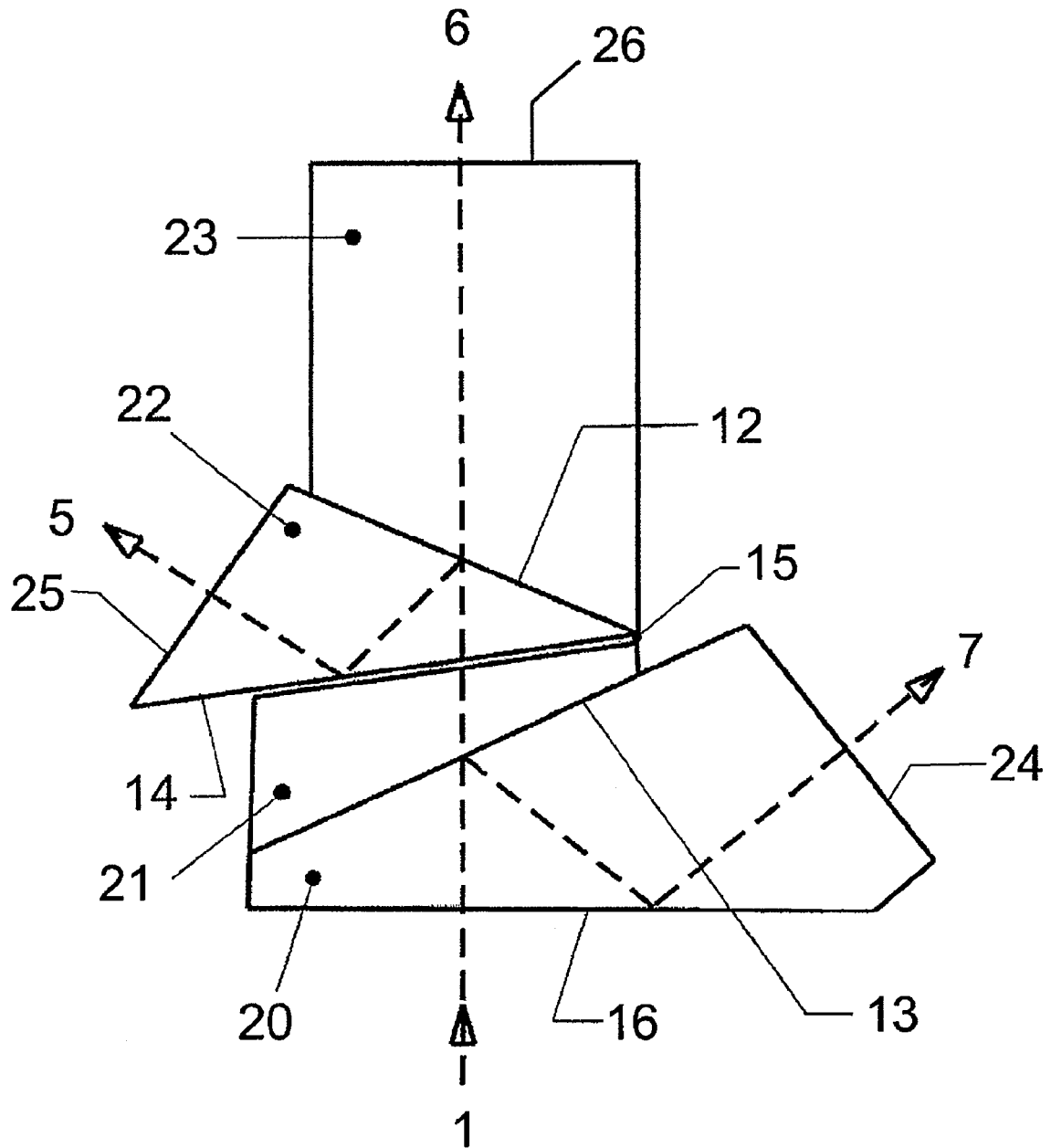
FIG. 2 illustrates an embodiment of a Phillips type waveband splitting prism system.

FIG. 2 illustrates a Phillips type waveband splitting prism system. A Phillips prism divides light into three components using four prism blocks 20-23. These components are typically, red, green, and blue. A gap exists between prism 21 and 22. In the case of a Phillips prism designed to split white light 1 into red, green, and blue, a blue reflecting dichroic film is applied to surface 13 and red reflecting dichroic film is applied to surface 12. White light 1 consisting of red, green and blue light enters face 16. Upon interaction with interface 13, s-polarized light 7 having substantially the color blue is reflected off of the surface and exits face 24. P-polarized light consisting substantially of blue and green passes through an air gap 15 and enters prism 22 through surface 14. When this light interacts with interface 12, s-polarized light 5 having substantially the color red is reflected off of the surface 12 and exits face 25. Substantially green p-polarized light 6 will pass through interface 12 and exit face 26.

Figure 3:
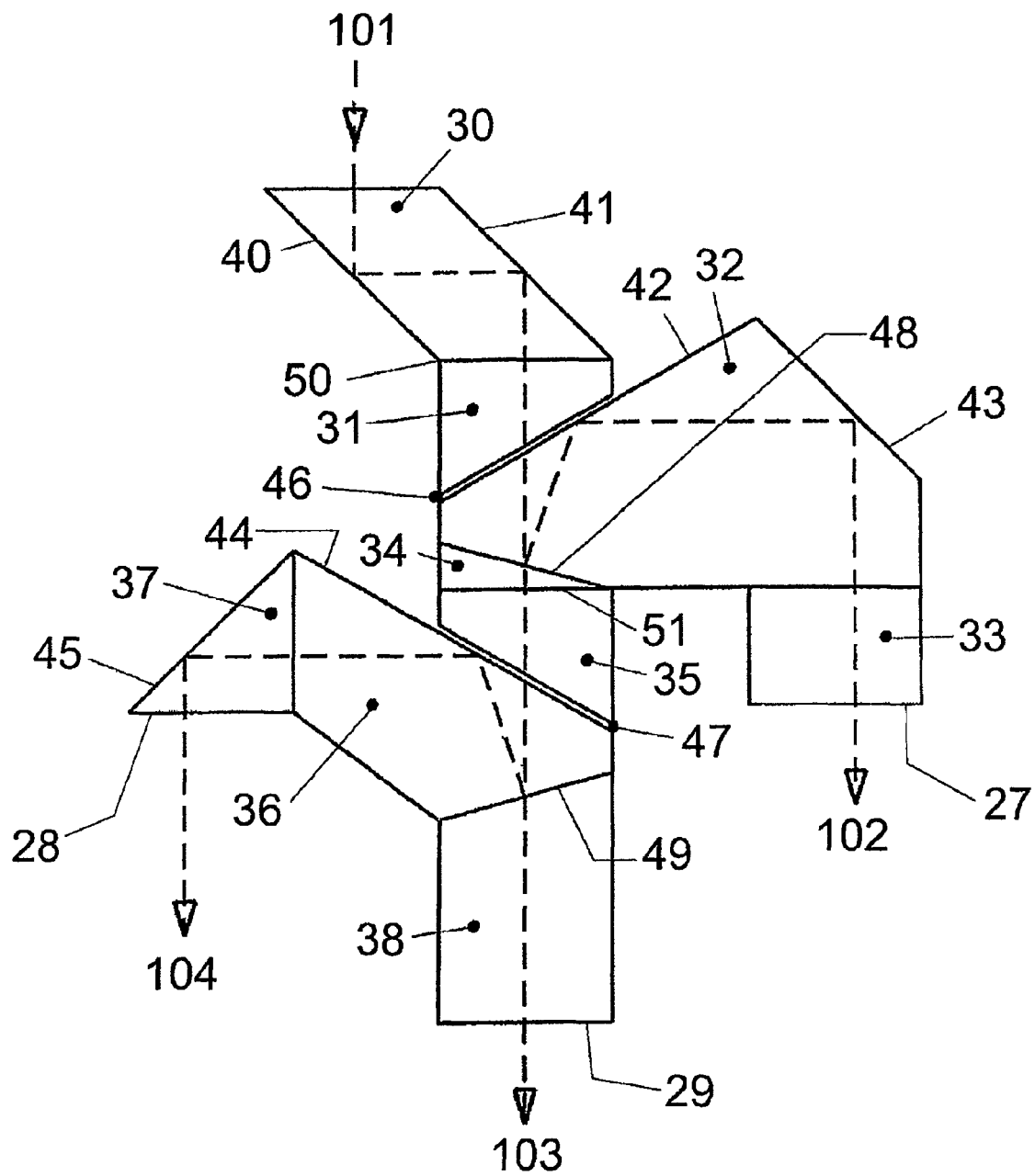
FIG. 3 illustrates a side view of a first embodiment of the present invention.
Figure 4:
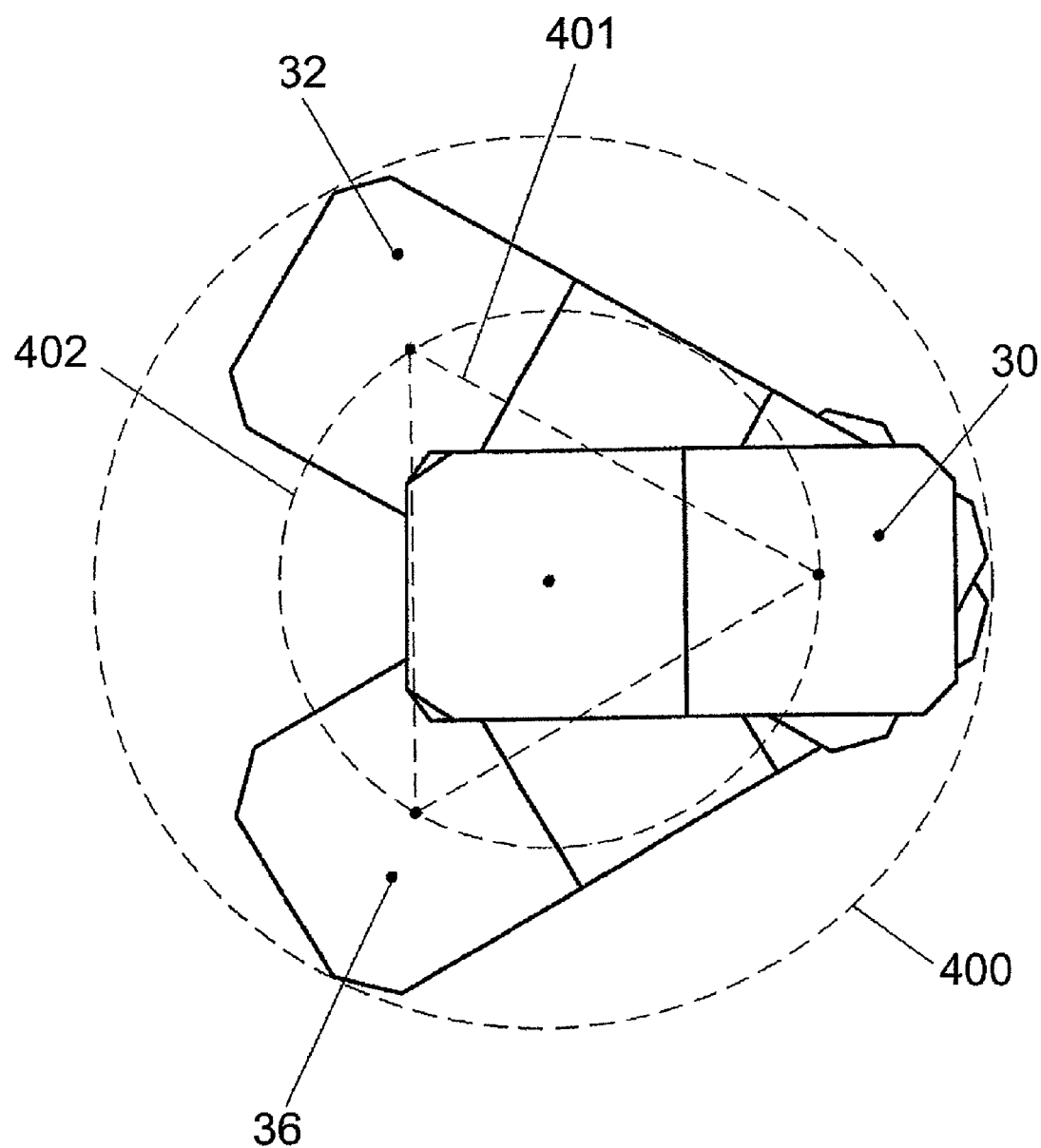
FIG. 4 illustrates a top view of a first embodiment of the present invention.
Figure 5:
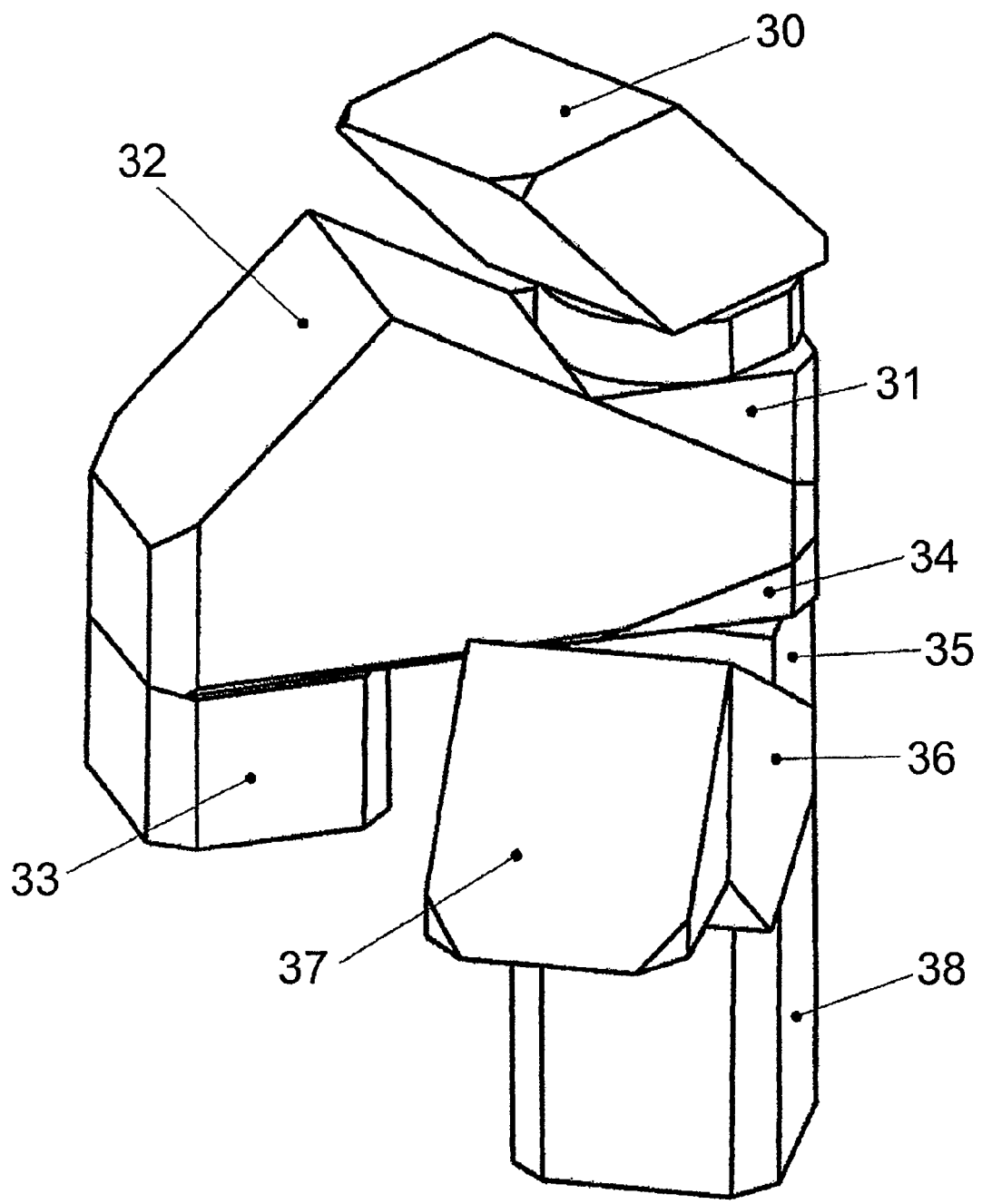
FIG. 5 illustrates an isometric view of a first embodiment of the present invention.

The first embodiment of the present invention is illustrated in FIGS. 3, 4, and 5. Referring to the drawings in detail, FIG. 3 illustrates a side view of a first embodiment. This prism system splits a broadband incoming beam 101 into three narrower band output beams 102-104. An incoming broadband beam 101 enters prism subsection 30, which has the shape of a parallelogram. The purpose of prism subsection 30 is to shift the input beam 101 laterally to ensure rotational symmetry of the input 101 and output beams 102-104. The beam next enters prism subsection 31, and then passes into a narrow parallel air gap 46 that is inclined at an angle of approximately 30 degrees relative to the incoming beam. The beam then passes into prism subsection 32, where an s-polarized portion 102 is reflected from dichroic mirror 48, which is inclined at a fairly shallow angle of about 15 degrees relative to the incoming beam. Beam 102 then undergoes a total internal reflection at surfaces 42 and 43, after which it passes through optical path equalizing block 33 and then out of the prism system through surface 27. The remainder of 101 passes through dichroic mirror 48 into prism subsections 34 and 35, then past a narrow parallel air gap 47, which is inclined at about 30 degrees relative to the incoming beam, into prism subsection 36. At the dichroic mirror 49, which is inclined at about 15 degrees relative to the incoming beam, the remainder of 101 is split into s-polarized beam 104, which is reflected at 49 and p-polarized beam 103, which passes straight through 49. After reflection at 49, beam 104 undergoes total internal reflection at 44 and 45, and then exits the prism system through surface 28. The remaining beam 103 passes into an optional optical path equalizing block 38, and then out of the prism system through surface 29. Total internal reflection surfaces 43 and 45 are inclined at about 45 degrees with respect to the incoming beam, which means the beam changes direction by about 90 degrees after reflection from these surfaces.

Surfaces 50 and 51 are pivot surfaces that are normal to the incoming beam. The prism subcomponents on either side of these surfaces 30-31 and 34-35 can be rotated on an axis parallel to the incoming beam in order to achieve the desired geometry of the incoming and outgoing beams. FIG. 3 show the system "flattened" into two dimensions, and indicates that 102-104 are all parallel to each other and located in the same plane. For some applications it may be desirable to use this coplanar configuration. However, in general it will be useful to rotate at least one portion of the prism at 50 or 51 to orient the output beams into a different three dimensional configuration such as the one illustrated in FIG. 4.

Wavebands separated by each prism element are determined by the optical reflection and transmission characteristics of the dichroic coating used. The prism elements can be configured using appropriate dichroic coatings chosen to separate specific bands of light. The dichroic coating on the first dichroic mirror determines what wavebands will be reflected, making up the first split beam, and what wavebands remain in the transmitted beam. The transmitted beam generally contains only wavebands that are not reflected out by the dichroic mirror. In the case of a beam being split into three or more wavebands, an appropriately selected second dichroic mirror splits the wavebands remaining in the transmitted beam. Additional dichroic mirrors may be used to further separate remaining wavebands as they pass through the system. As such, the wavebands transmitted through each additional dichroic mirror are determined by the previous dichroic mirrors.

FIG. 4 is a top view of the prism system, showing the symmetry of the input and output beams 401. This provides for a wide separation of the output beams while allowing the entire system to fit within a narrow cylindrical envelope 400.

FIG. 5 shows an isometric view of the first embodiment in which the input and output beams are oriented according to FIG. 4.

Figure 6:
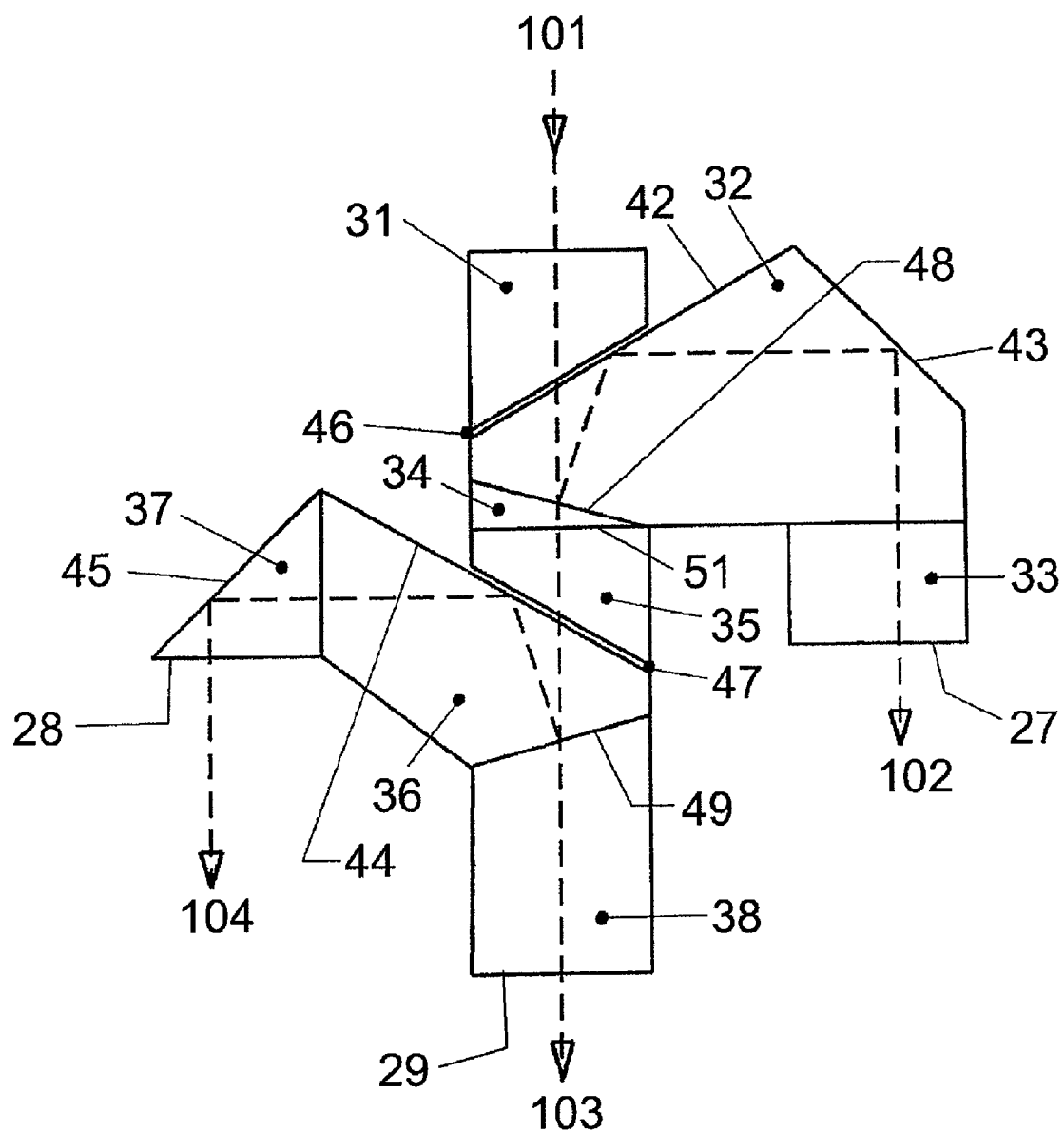
FIG. 6 illustrates a side view of a second embodiment of the present invention.

The embodiment illustrated in FIG. 6 is similar to the first embodiment except that the top parallelogram portion has been removed. This construction is useful when the input and output beams need not have perfect rotational symmetry, and this simplifies the prism and reduces its total length.

Figure 7:
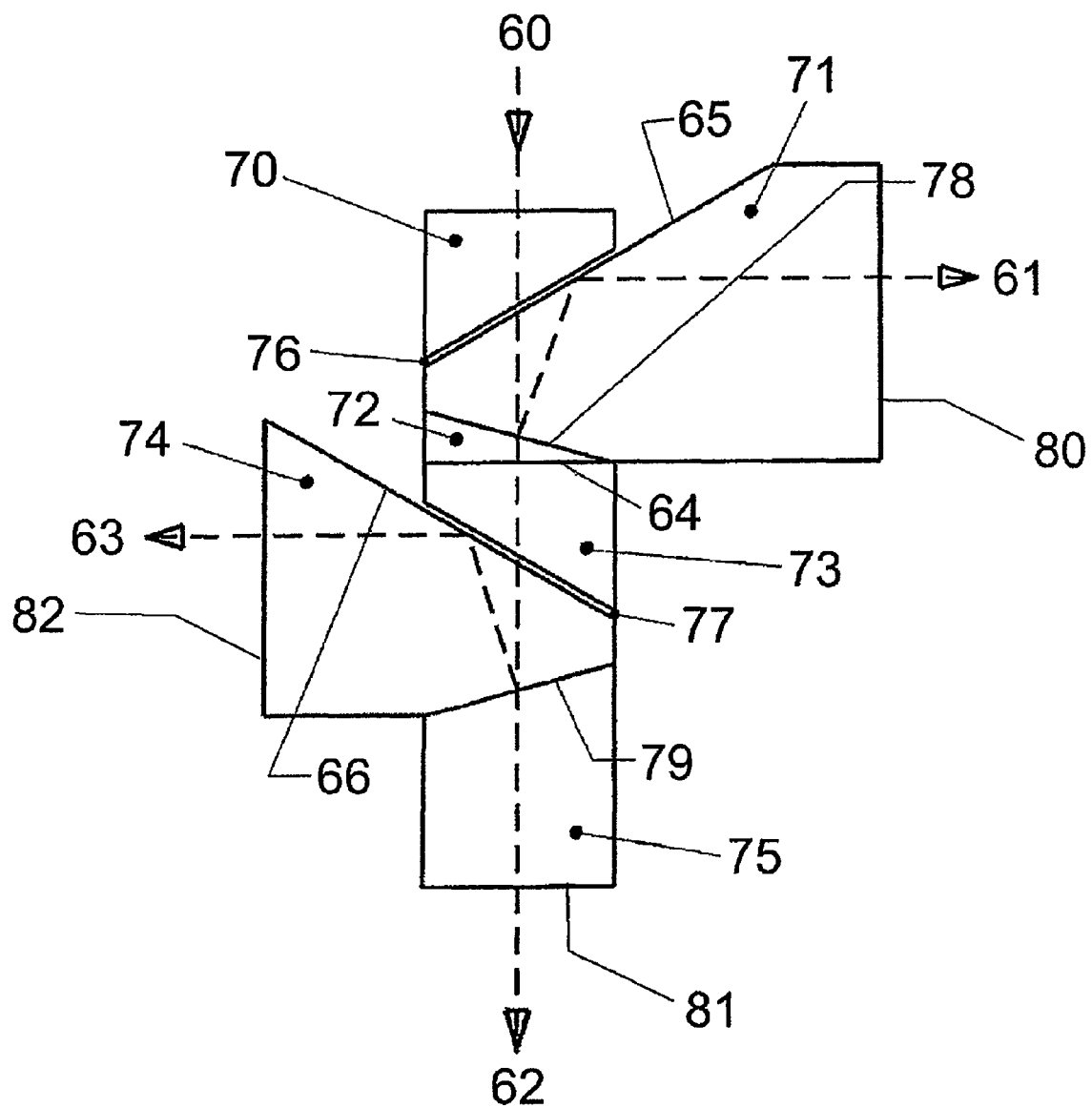
FIG. 7 illustrates a side view of a third embodiment of the present invention.

The embodiment illustrated in FIG. 7 is similar to the first two embodiments except that prism subsections 71 and 74 have been modified to allow 61 and 63 to exit the system in a direction perpendicular to both beams 60 and 62. This prism system also splits a broadband incoming beam 60 into three narrower band output beams 61-63. An incoming broadband beam 60 enters prism subsection 70, and then passes into a narrow parallel air gap 76 that is inclined at an angle of approximately 30 degrees relative to the incoming beam. The beam then passes into prism subsection 71, where an s-polarized portion 61 is reflected from a dichroic mirror 78, which is inclined at a fairly shallow angle of about 15 degrees relative to the incoming beam. Beam 61 then undergoes a total internal reflection at 65 before it exits the prism through surface 80. The remainder of beam 60 passes through dichroic mirror 78 into prism subsections 72 and 73, then past a narrow parallel air gap 77, which is inclined a about 30 degrees relative to the incoming beam, into prism subsection 74. At the dichroic mirror 79, which is inclined at about 15 degrees relative to the incoming beam, the remainder of the original incoming beam 60 is split into s-polarized beam 63, which is reflected at 79 and p-polarized beam 62, which passes straight through 79. After reflection at 79, beam 63 undergoes total internal reflection at 66 before exiting the prism system through surface 83 in a direction perpendicular to both the original incoming beam 60 and beam 62. The remaining beam 62 passes into an optional optical block 75, and then out of the prism system through surface 81. This modification reduces the total length of the system so the optional optical path length equalizing block 75 becomes shorter.

Surface 64 is a pivot surface that is normal to the incoming beam. The prism subcomponents on either side of this surface 72 and 73 can be rotated on an axis parallel to the incoming beam in order to achieve the desired geometry of the incoming and outgoing beams. FIG. 7 shows the system "flattened" into two dimensions, and indicates that beams 61 and 63 are located in the same plane. For some applications it may be desirable to use this coplanar configuration. However, it will likely be useful to rotate the prisms to orient the output beam in to different three dimensional configurations.

Figure 8:
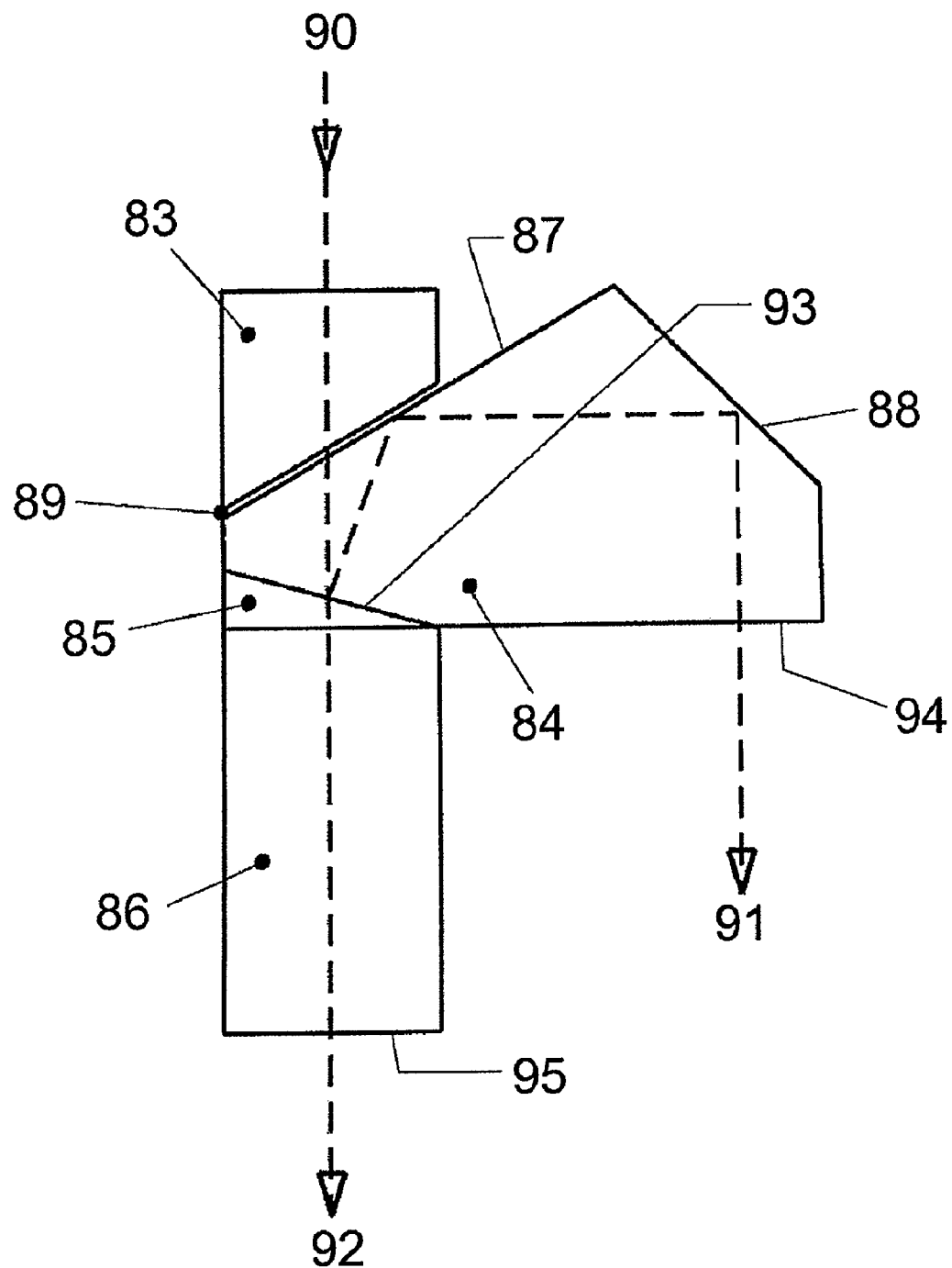
FIG. 8 illustrates a side view of a fourth embodiment of the present invention.

The embodiment illustrated in FIG. 8 is similar to the second embodiment except that an entire portion of the prism has been removed to yield a two-channel system instead of a three-channel system. The beam 92 is collinear with the incoming original beam 90, and beam 91 is parallel to 92. This prism system splits a broadband incoming beam 90 into two narrower band output beams 91 and 92. An incoming broadband beam 90 enters prism subsection 83, and then passes into a narrow parallel air gap 89 that is inclined at an angle of approximately 30 degrees relative to the incoming beam. The beam then passes into prism subsection 84, where an s-polarized portion 91 is reflected from a dichroic mirror 93, which is inclined at a fairly shallow angle of about 15 degrees relative to the incoming beam. Beam 91 then undergoes a total internal reflection at 87 and 88 before it exits the prism through surface 94. The remainder of the beam 90 passes as p-polarized light 92 through dichroic mirror 93 into prism subsections 85 and 86 before exiting the prism system through surface 95.

Figure 9:
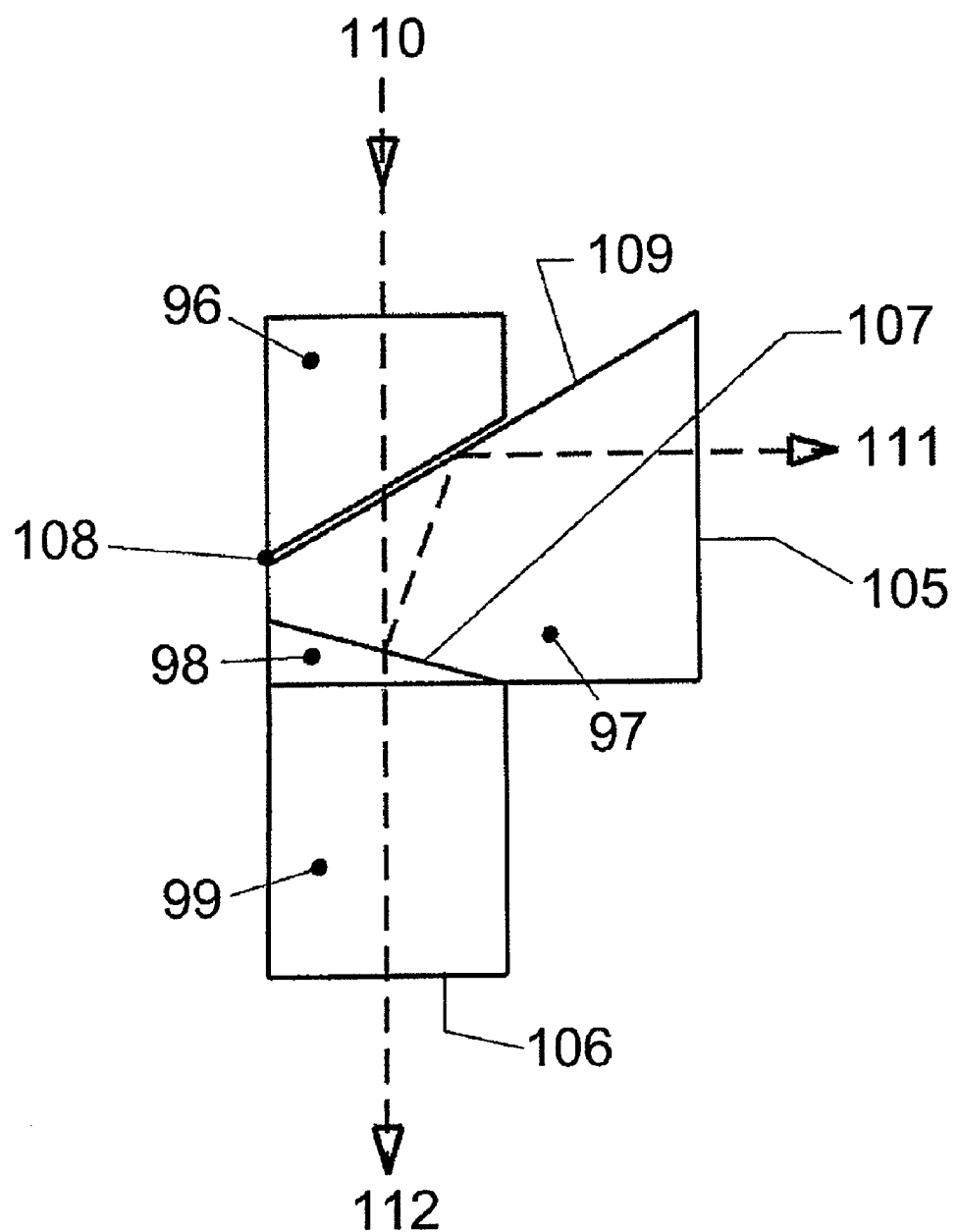
FIG. 9 illustrates a side view of a fifth embodiment of the present invention.

The embodiment illustrated in FIG. 9 is similar to the fourth embodiment except that the prism subsection 97 has been modified to allow 111 to exit the system in a direction perpendicular to 110 and 112, which are collinear.

This prism system splits a broadband incoming beam 110 into two narrower band output beams 111-112. An incoming broadband beam 110 enters prism subsection 96, and then passes a narrow parallel air gap 108 that is inclined at an angle of approximately 30 degrees relative to the incoming beam. The beam then passes into prism subsection 97, where an s-polarized portion 111 is reflected from a dichroic mirror 107, which is inclined at a fairly shallow angle of about 15 degrees relative to the incoming beam. Beam 111 then undergoes a total internal reflection at 109 before it exits the prism surface at 105. The remainder of beam 110 passes through the dichroic mirror 107 as p-polarized light into prism subsections 98 and 99 and then exits element 99 through surface 106.

Figure 10:
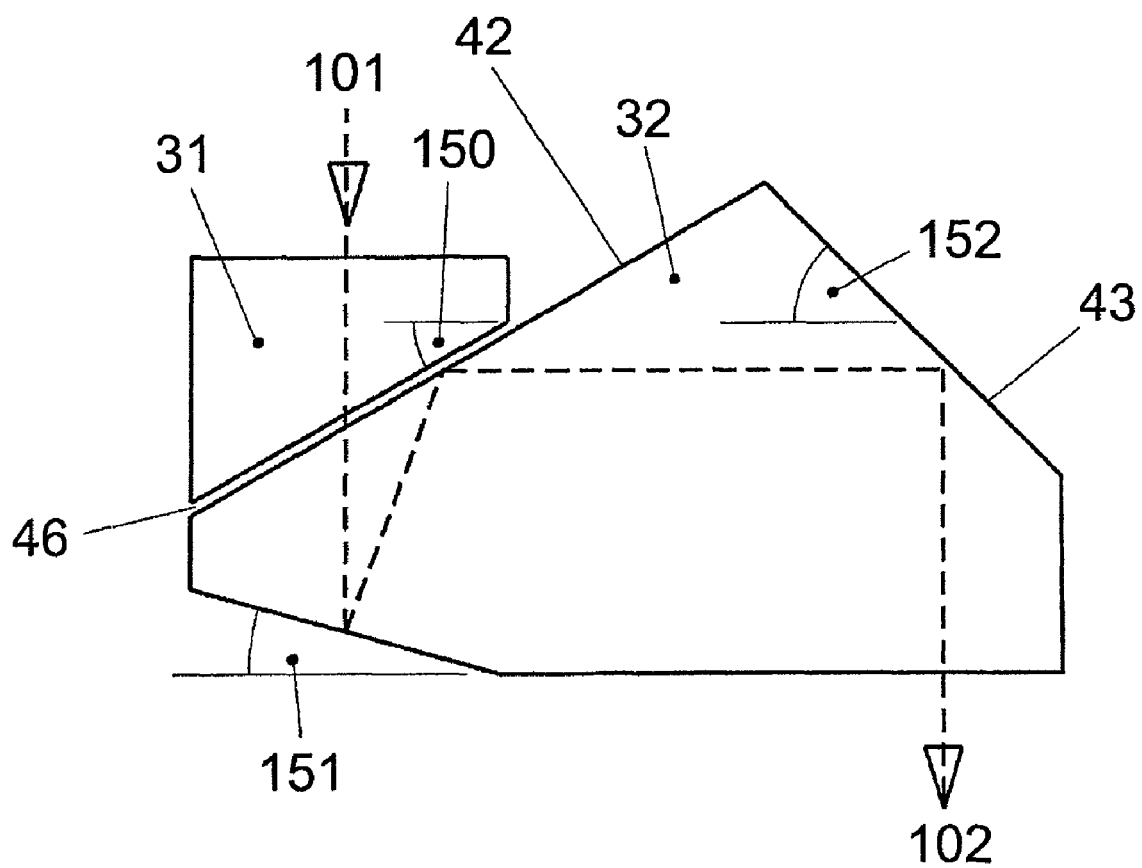
FIG. 10 illustrates a sectional view of a first embodiment of the present invention.

FIG. 10 illustrates in more detail the optical path through the top section of the prism giving rise to beam 102. Angles 150, 151, and 152 are approximately 30 degrees, 15 degrees, and 45 degrees, respectively. These angles ensure good performance for the dichroic surface, excellent total internal reflectivity, and parallel input and output paths.

Figure 11:
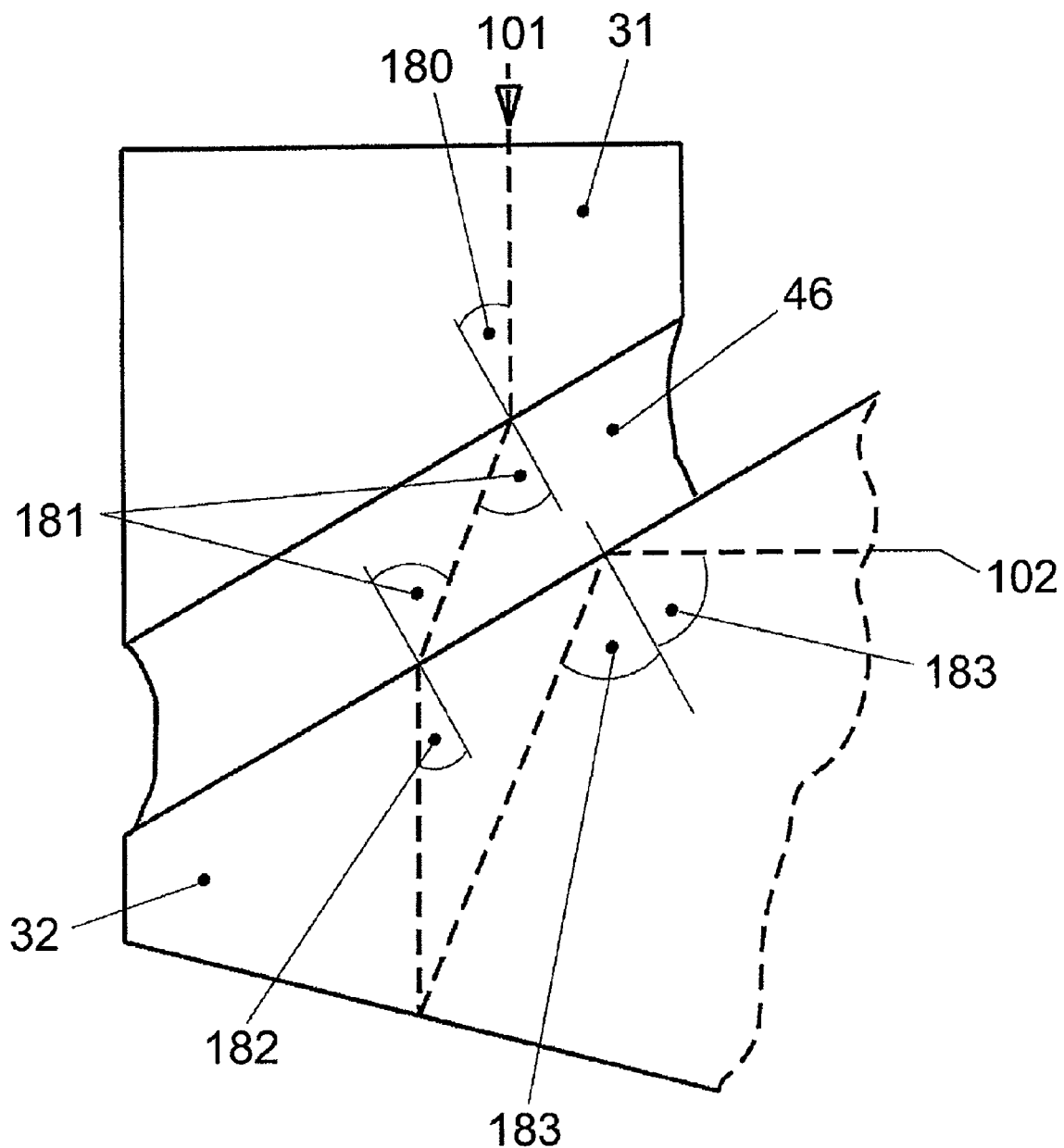
FIG. 11 illustrates a sectional view of a first embodiment of the present invention.

FIG. 11 shows the first air gap in greater detail. Angles 180 and 183 are approximately 30 degrees and 60 degrees, respectively. Angle 181 is given by Snell's law:

$$\mathrm{Sin}(\mathrm{Angle}\ 181) = \mathrm{Arcsin}((n31/n46)\mathrm{sin}(\mathrm{Angle}\ 180))$$

where n31 and n46 are the refractive indices of element 31 and element 46, respectively. Ideally, angle 180 is as close to angle 181 as possible in order to avoid polarization effects. If n31 and n32 (refractive index of element 32) are sufficiently large (e.g. 1.75 or higher), then it is possible to fill the air gap 46 with a low index fluid or cement and still achieve total internal reflection on the return bounce. The boundary condition on n46 for ensuring that total internal reflection will occur is:

$$n46=(n32)\sin(\text{Angle 183})$$

If, for example, element 32 is made of Ohara S-JAH66 optical glass having a refractive index of 1.773 and angle 183 is 60 degrees, then n46 must be lower than 1.535. A good choice of material to fill the air gap 46 is Dow Corning Sylgard 184, which has an index of refraction of approximately 1.43. Sylgard also remains flexible when cured, which prevents problems with thermal expansion within the prism structure. Advantages of cementing the air gaps include: 1) the prism structure becomes more rigid; 2) the transmission through the gaps improves; and 3) the polarization effects upon passing through the air gaps are reduced.

While various embodiments of the present invention have been described above, it should be understood that they have been presented by way of example only, and not of limitation. The invention is not restricted to the illustrated example architectures or configurations, but can be implemented using a variety of alternative architectures and configurations. Additionally, although the invention is described above in terms of various exemplary embodiments and implementations, it should be understood that the various features and functionality described in one or more of the individual embodiments are not limited in their applicability to the particular embodiment with which they are described, but instead can be applied, alone or in some combination, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

What we claim is:

1. An optical beamsplitting device, comprising:
   one or more dichroic mirrors; and
   a plurality of optical prisms configured for directing a incoming broadband beam of light through the one or more dichroic mirrors for separating the broadband beams into two or more component waveband beams, wherein said optical prisms are rotatable for folding the optical beamsplitting device into a compact three dimensional configuration.

2. The optical beamsplitting device according to claim 1, the dichroic mirrors having a low angle of incidence with the incoming beam.

3. The optical beamsplitting device according to claim 1, the optical prisms and dichroic mirrors further configured for forming the component waveband beams as outgoing beams having an orientation parallel to an orientation of the incoming beam.

4. The optical beamsplitting device according to claim 1, the optical prisms and dichroic mirrors further configured for forming the component waveband beams as outgoing beams having an orientation perpendicular to the orientation of the incoming beam.

5. The optical beamsplitting device according to claim 1, wherein said optical prisms are configured for insertion into a compact cylindrical sleeve.

6. The optical beamsplitting device according to claim 1, wherein said dichroic mirrors have an angle of incidence with the incoming beam of less than about 30 degrees.

7. The optical beamsplitting device according to claim 1, wherein said optical prisms are rotatable for orienting the component waveband beams into a symmetrical arrangement.

8. The optical beamsplitting device according to claim 1, wherein a component waveband beam reflected off of the first dichroic surface is totally internally reflected inside an optical prism.

9. The optical beamsplitting device according to claim 1, further comprising a first parallel air gap formed in part by the first reflection surface of the first prism.

10. The optical beamsplitting device according to claim 9, wherein the first parallel air gap is filled with a fluid or optical cement with a low refractive index.

11. The optical beamsplitting device according to claim 9, wherein the first parallel air gap is filled with Dow Corning Sylgard 184.

12. The optical beamsplitting device according to claim 1, further comprising a second parallel air gap formed in part by the first reflection surface of the second prism.

13. The optical beamsplitting device according to claim 12, wherein the second parallel air gap is filled with a fluid or optical cement with a low refractive index.

14. The optical beamsplitting device according to claim 13, wherein the second parallel air gap is filled with Dow Corning Sylgard 184.

15. The optical beamsplitting device according to claim 1, further comprising a parallelogram prism for shifting the incoming broadband beam laterally.

16. The optical beamsplitting device according to claim 15, wherein a first component outgoing waveband beam, a second component outgoing waveband beam, and a third component outgoing waveband beam of the incoming broadband beam exit the prism system in an equilateral triangular pattern that is centered on the incoming broadband beam.

17. The optical beamsplitting device according to claim 15, further comprising a first pivot surface between a first prism and the parallelogram prism that is normal to the incoming broadband beam.

18. The optical beamsplitting device according to claim 17, wherein the parallelogram prism can be rotated in relation to the first prism on the first pivot surface.

19. The optical beamsplitting device according to claim 1, further comprising a second pivot surface between a second prism and a third prism that is normal to the incoming broadband beam.

20. The optical beamsplitting device according to claim 19, wherein the second prism can be rotated in relation to the third prism on the second pivot surface.

21. The optical beamsplitting device according to claim 1, wherein a first component outgoing waveband beam, a second component outgoing waveband beam, and a third component outgoing waveband beam of the incoming broadband beam each encompasses a subset of the waveband contained in the incoming beam.

22. The optical beamsplitting device according to claim 21, wherein the incoming broadband beam is white visible light, and each of the first component outgoing waveband beam, the second component outgoing waveband beam, and the third component outgoing waveband beam of the incoming broadband beam are selected from the group consisting red, green, and blue.

23. The optical beamsplitting device according to claim 21, wherein the waveband of the incoming broadband beam is 450-1800 nm, and the waveband of the first component outgoing waveband beam, the second component outgoing waveband beam, and the third component outgoing waveband beam of the incoming broadband beam are selected from the group consisting of 450-650 nm, 650-900 nm, and 900-1800 nm.

24. The optical beamsplitting device according to claim 21, wherein the optical device is operable for use in a periscope system.

25. The optical beamsplitting device according to claim 21, wherein the optical device is operable for use in a camera.

26. The optical beamsplitting device according to claim 21, wherein the optical device is operable for use in a projection device.

27. The optical beamsplitting device according to claim 21, wherein the optical device is operable for combining three light beams into a single light beam.

28. A method for splitting a beam of light, comprising:
   directing an incoming broadband beam of light through one or more dichroic mirrors and an optical prism system;
   unfolding said optical prism system from a compact three dimensional configuration; and
   separating component waveband beams from said single incoming broadband beam of light utilizing the dichroic mirrors and the optical prism system.

29. The method according to claim 28, further comprising directing said component beams to have an orientation parallel to said incoming beam.

30. The method according to claim 29, further comprising rotating the optical prism system to orient the component waveband beams into a symmetrical arrangement.

31. The method according to claim 28, further comprising directing said component beams to have an orientation perpendicular to said incoming beam.

32. The method according to claim 28, further comprising removing said optical prism configuration from a compact cylindrical sleeve.

33. The method according to claim 28, further comprising reflecting a component waveband beam off of the first dichroic surface and totally internally reflecting the component waveband beam inside the optical prism.

34. The method according to claim 28, further comprising forming a first parallel air gap in part by the first reflection surface of the first prism.

35. The method according to claim 34, further comprising filling the first parallel air gap with a fluid or optical cement with a low refractive index.

36. The method according to claim 34, further comprising filling the first parallel air gap with Dow Corning Sylgard 184.

37. The method according to claim 28, further comprising forming a second parallel air gap in part by the second reflection surface of the second prism.

38. The method according to claim 37, further comprising filling the second parallel air gap with a fluid or optical cement with a low refractive index.

39. The method according to claim 37, further comprising filling the second parallel air gap with Dow Corning Sylgard 184.

40. The method according to claim 28, further comprising shifting the incoming broadband beam laterally using a parallelogram prism.

41. The method according to claim 40, further comprising configuring a first component outgoing waveband beam, a second outgoing waveband beam, and a third component outgoing waveband beam of the incoming broadband beam so that they exit the prism system in an equilateral triangular pattern that is centered on the incoming broadband beam.

42. The method according to claim 40, further comprising pivoting a first pivot surface between a first prism and the parallelogram prism that is normal to the incoming broadband beam.

43. The method according to claim 42, further comprising rotating the parallelogram prism in relation to the first prism on the first pivot surface.

44. The method according to claim 28, further comprising pivoting a second pivot surface between a second prism and a third prism that is normal to the incoming broadband beam.

45. The method according to claim 44, further comprising rotating the second prism in relation to the third prism on the second pivot surface.

46. The method according to claim 28, further comprising splitting an incoming broadband beam into a first component outgoing waveband beam, a second component outgoing waveband beam, and a third component outgoing waveband beam encompassed in the incoming broadband beam.

47. The method according to claim 46, further comprising splitting an incoming broadband beam into component beams selected from the group consisting of red, green, and blue.

48. The method according to claim 46, further comprising splitting an incoming broadband beam into components selected from the group consisting of 450-650 nm, 650-900 nm, and 900-1800 nm.

49. The method according to claim 46, further comprising configuring the optical device for use in a periscope system.

50. The method according to claim 45, further comprising configuring the optical device for use in a camera.

51. The method according to claim 46, further comprising configuring the optical device for use in a projection device.

52. The method according to claim 46, further comprising configuring the optical device for combining three light beams into a single light beam.

* * * * *